United States Patent
Cho

(10) Patent No.: US 7,370,871 B2
(45) Date of Patent: May 13, 2008

(54) VEHICLE FRAME WITH SHOCK ABSORBING SYSTEM

(75) Inventor: Jih-Kuei Cho, Pingjhen (TW)

(73) Assignee: Shine Far Metal Industry Co., Ltd., Guanyin Township (TW)

( * ) Notice: Subject to any disclaimer, the term of this patent is extended or adjusted under 35 U.S.C. 154(b) by 270 days.

(21) Appl. No.: 11/215,785

(22) Filed: Aug. 29, 2005

(65) Prior Publication Data
US 2007/0045979 A1 Mar. 1, 2007

(51) Int. Cl.
*B62D 7/20* (2006.01)
(52) U.S. Cl. .............................. 280/124.109; 280/788; 180/299
(58) Field of Classification Search ................ 280/788, 280/124.177, 124.109; 267/104.12; 180/299, 180/311, 312
See application file for complete search history.

(56) References Cited

U.S. PATENT DOCUMENTS

| | | | | |
|---|---|---|---|---|
| 3,408,088 A | * | 10/1968 | Corbin | 280/124.106 |
| 3,979,110 A | * | 9/1976 | Newton | 267/140 |
| 4,240,517 A | * | 12/1980 | Harlow et al. | 180/295 |
| 4,453,740 A | * | 6/1984 | von der Ohe et al. | 280/781 |
| 4,717,111 A | * | 1/1988 | Saito | 267/140.12 |
| 4,779,834 A | * | 10/1988 | Bittner | 248/638 |
| 4,884,779 A | * | 12/1989 | Drabing et al. | 248/610 |
| 4,943,092 A | * | 7/1990 | Haraguchi | 280/124.109 |
| 5,035,296 A | * | 7/1991 | Sjostrand | 180/297 |
| 2003/0220438 A1 | * | 11/2003 | Kimura et al. | 524/492 |

* cited by examiner

*Primary Examiner*—Paul N. Dickson
*Assistant Examiner*—Leonard McCreary, Jr.
(74) *Attorney, Agent, or Firm*—Mark A. Mersereau; Nikolai & Mersereau, P.A.

(57) ABSTRACT

A shock absorbing member includes a first member composed of a first tube and a second tube which is located at a center of the first tube. Shock absorbing material is filled between the first tube and the second tube. Two second members are located below the first member and connected to the first member by at least one board. Each second member has a third tube and a fourth tube which extends through the third tube. Shock absorbing material is filled between the third tube and the fourth tube. Four shock absorbing member are connected between a first frame and a second frame. The first members are connected with the first frame which carries power system such as engine, and the second members are connected to a second frame which is connected to wheels.

3 Claims, 5 Drawing Sheets

VEHICLE FRAME WITH SHOCK ABSORBING SYSTEM

FIELD OF THE INVENTION

The present invention relates to a vehicle frame with shock absorbing system and includes shock absorbing members connected at joints of two frames of the vehicles.

BACKGROUND OF THE INVENTION

Conventional three-wheel motor powered vehicles or beach cars include a simple structure with a basic power system and a frame on which the power system is installed. These vehicles are designed to carry goods so that comfortable driving is not a main goal for these types of vehicles. The power system including the engine generates vibration during movement of the vehicles and the severe vibration makes the driver feel uncomfortable. However, due to the consideration of cost, most of these types of vehicles do not have sufficient shock absorbing system to reduce the vibration.

The present invention intends to provide a shock absorbing system which includes a plurality of shock absorbing members composed of a first tube filled with shock absorbing material and two second tubes which are connected to the first tube by two boards. The shock absorbing members are connected between two frames of the vehicle so as to absorb shocks and vibration generated by the power system of the vehicle.

SUMMARY OF THE INVENTION

The present invention relates to a shock absorbing member which comprises a first member and two second members which are connected to the first member by at least one board. The first member includes a first tube and a second tube extending through first tube and located at a center of the first tube. Shock absorbing material is filled between the first tube and the second tube. Each second member has a third tube and a fourth tube which extends through the third tube. Shock absorbing material is filled between the third tube and the fourth tube.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
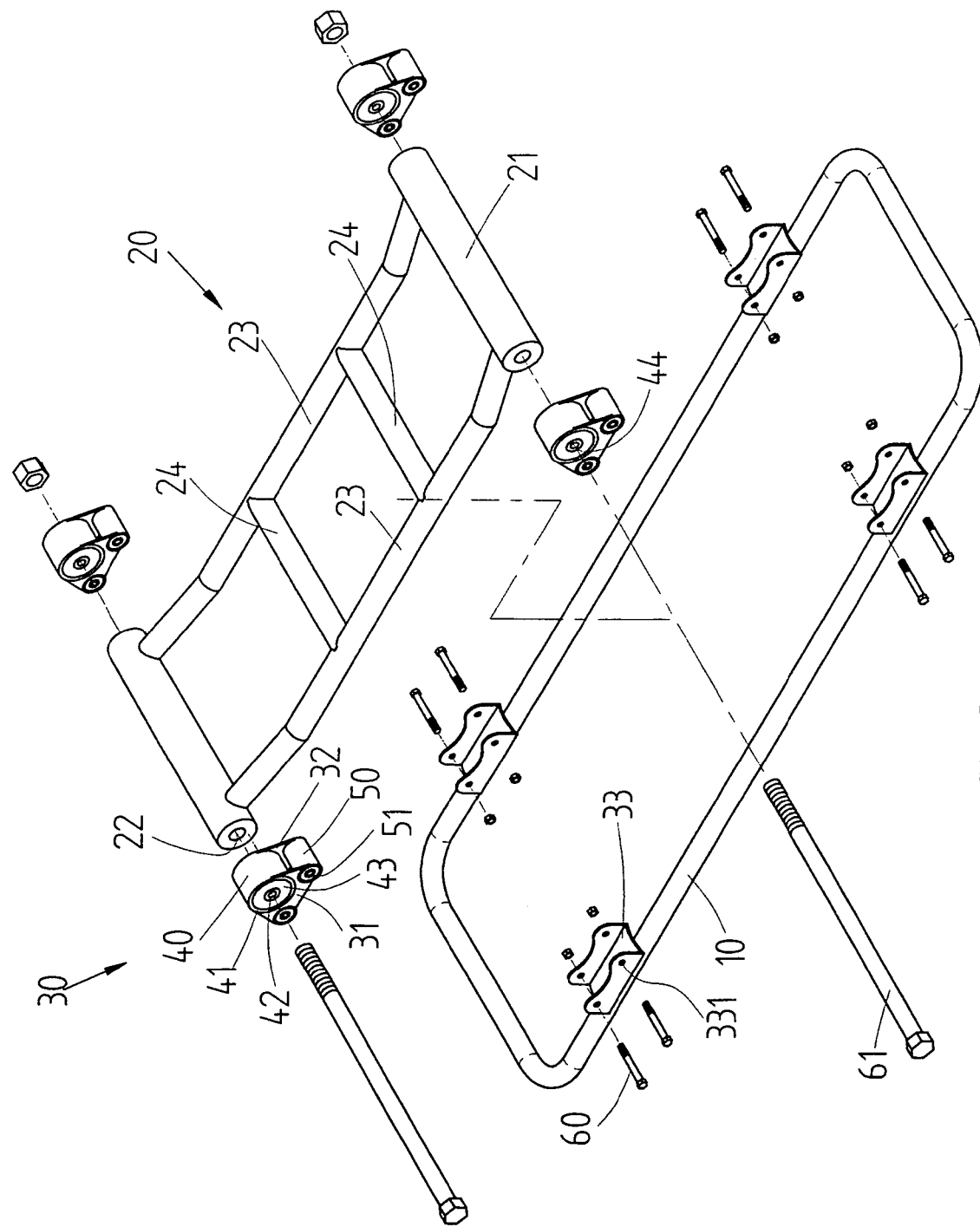
FIG. 1 is an exploded view to show two frames and the shock absorbing members of the present invention.
Figure 2:
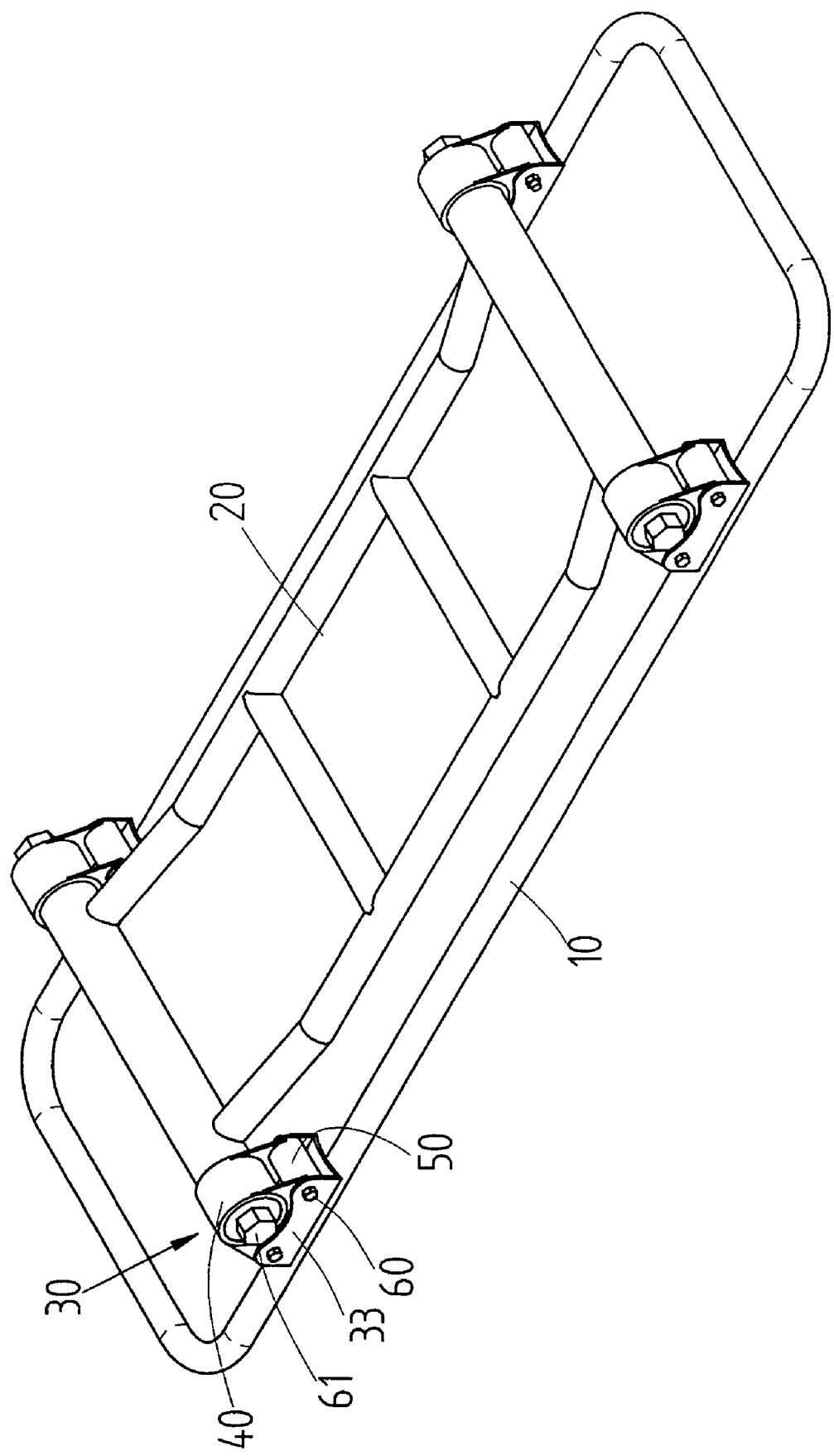
FIG. 2 is a perspective view to show the shock absorbing members of the present invention are connected between the two frames.
Figure 4:
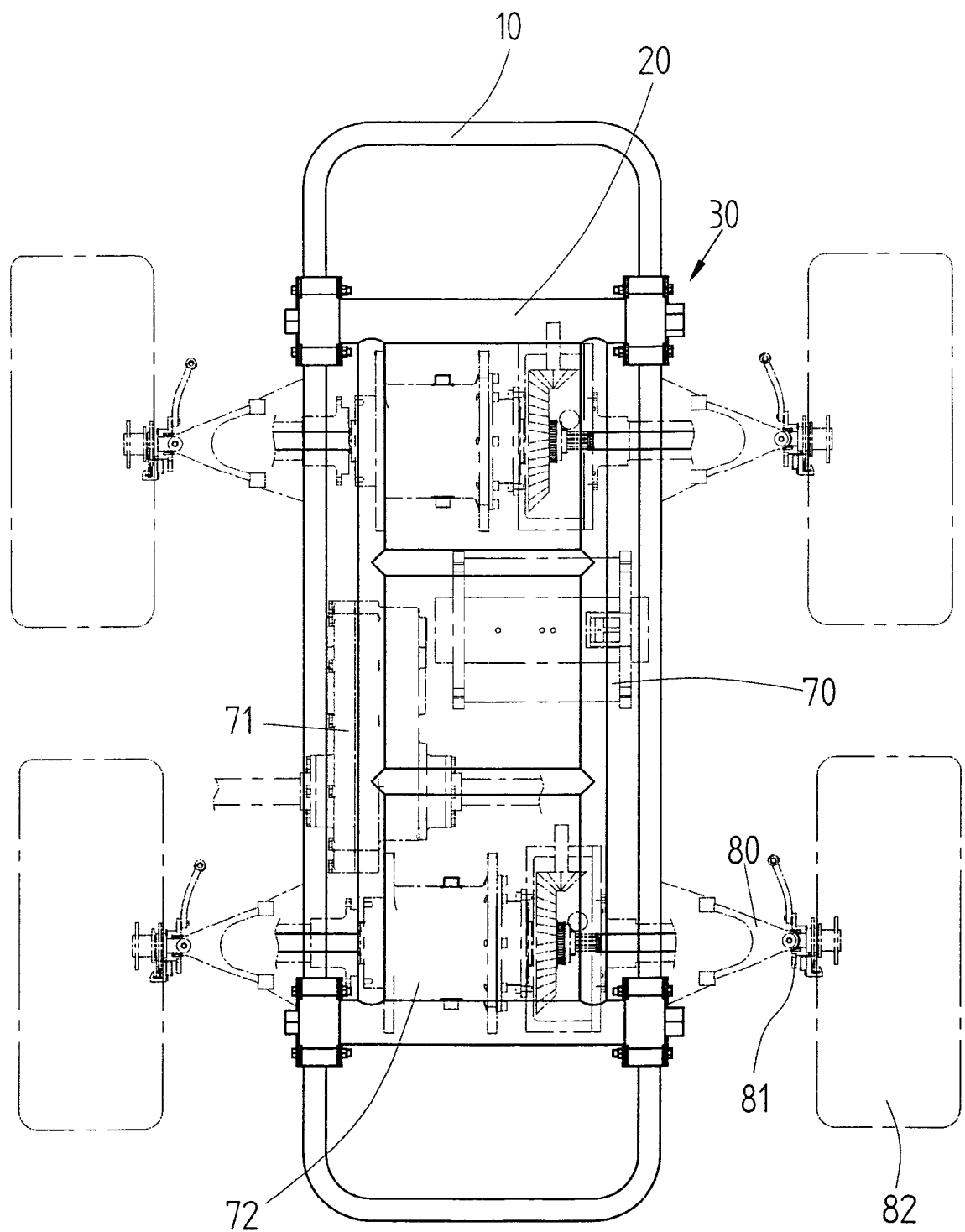
FIG. 4 is a top view to show a vehicle comprising the two frames and the shock absorbing members of the present invention.

Referring to FIGS. 1, 2 and 4, the vehicle frame of the present invention comprises a first frame 10 and a second frame 20 wherein the first frame 10 has four U-shaped support members 33 and each support member 33 has two lugs and each lug has two first holes 331 defined therethrough. Four shock absorbing members 30 are connected to the four support members 33. Each shock absorbing member 30 has a first member 40 which includes a first tube 41 and a second tube 42 which extends through first tube 41 and is located at a center of the first tube 41. Shock absorbing material 43 is filled between the first tube 41 and the second tube 42. The first member 40 is located between the two second members 50 which are located below the first member 40, and two triangular boards 31 connect the first member 40 and the two second members 50 therebetween. A diameter of the first member 40 is larger than that of each of the two second members 50. Each second member 50 has a third tube 51 and a fourth tube 52 which extends through the third tube. Shock absorbing material is filled between the third tube 51 and the fourth tube 52.

Further referring to FIGS. 1 and 4, two first pins 60 extend through the first holes 331 of each support member 33 and the two fourth tubes 52 of each shock absorbing member 30. Four arms 80 are connected to the first frame 10 and each arm 80 has a connection joint 81 so as to be connected to a wheel 82. The second frame 20 is located above the first frame 10 and includes two side bars 23 and two end tubes 21 which are connected between two respective ends of the two side bars 23. Two transverse bars 24 are connected between two side bars 23 so as to reinforce the structural strength of the second frame 20. The second frame 20 carries the power system which includes an engine 70, a gear box 71 and a differential 72. The two end tubes 21 are located higher than the transverse bars 23 of the second frame 20 for convenience of installation of the power system.

Each end tube 21 has a connection passage 22 defined axially therethrough and two shock absorbing members 30 are located on two ends of each end tube 21. Two second pins 61 respectively extend through the two connection passages 22 in the two end tubes 21 and the second tubes 42 of the shock absorbing members 30.

The first member 40 may absorb about 70% of the vibration and the two second members 50 absorb 30% of the vibration. Therefore, the shock absorbing system can absorb the vibrations to make the driver feel comfortable.

Figure 3:
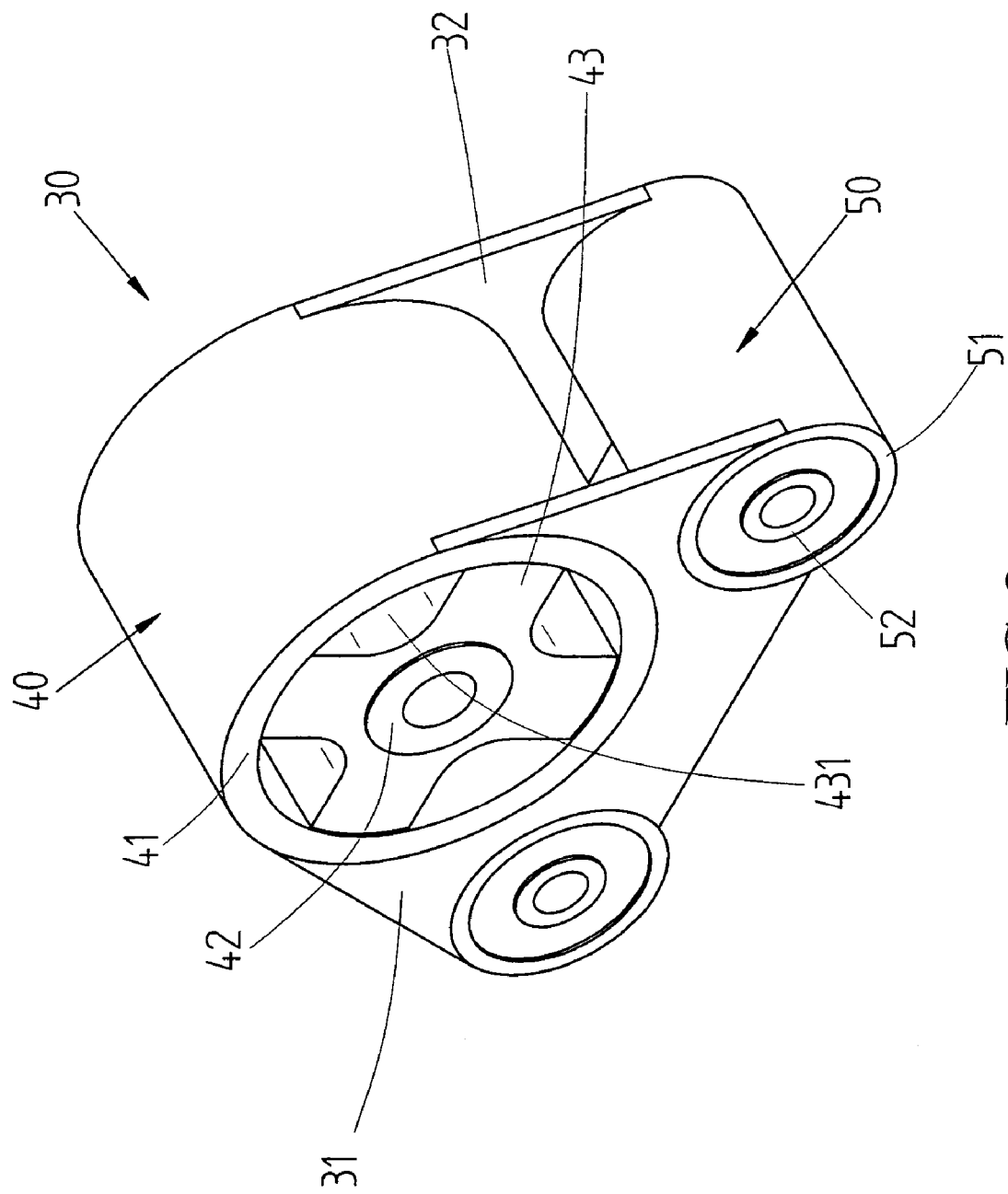
FIG. 3 shows another embodiment of the shock absorbing members of the present invention.
Figure 5:
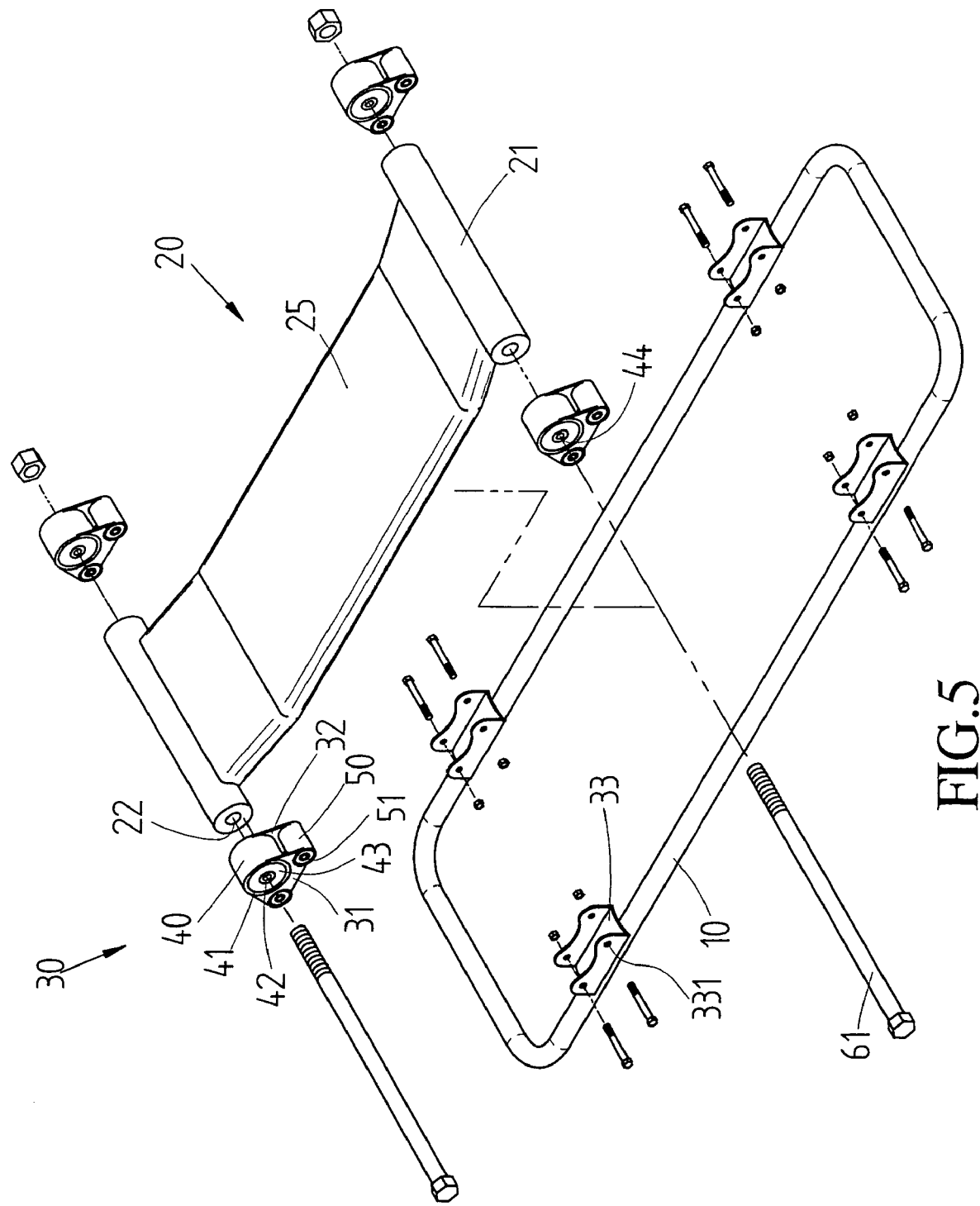
FIG. 5 is an exploded view to show another embodiment of the two frames and the shock absorbing members of the present invention.

As shown in FIG. 3, several passages 431 are defined axially through the shock absorbing material 43 in the first tube 41 so as to reduce the weight of the shock absorbing member 30. FIG. 5 shows that the second frame 20 can be a rectangular board 25 with two end tubes 21 as well.

While we have shown and described the embodiment in accordance with the present invention, it should be clear to those skilled in the art that further embodiments may be made without departing from the scope of the present invention.

What is claimed is:

1. A vehicle frame structure, comprising: a first frame having four support members and each support member having two lugs and each lug having two first holes defined therethrough, the first frame adapted to be connected to wheels; each support member having a shock absorbing member connected thereto, the shock absorbing member having a first member which includes a first tube and a second tube extending through first tube and is located at a center of the first tube, shock absorbing material filled between the first tube and the second tube, two second members located below the first member and at least one board connecting the first member and the two second member, each second member having a third tube and a fourth tube which extends through the third tube, shock absorbing material filled between the third tube and the fourth tube, two first pins extending through the first holes of each support member and the two fourth tubes of each shock absorbing member, and a second frame located above the first frame and having two end tubes, the second frame adapted to be connected with power system, each end tube having a connection passage defined axially therethrough, two shock absorbing members located on two ends of each end tube, two second pins respectively extending through the two connection passages in the two end tubes and the second tubes of the shock absorbing members.

2. The vehicle frame structure as claimed in claim 1, wherein the second frame includes two side bars and the two end tubes are connected between two respective ends of the two side bars, two transverse bars are connected between two side bars.

3. The vehicle frame structure as claimed in claim 1, wherein the two end tubes are located higher than the transverse bars of the second frame.

* * * * *